F. H. ROYCE.
CONNECTING ROD FOR RECIPROCATING ENGINES.
APPLICATION FILED JAN. 6, 1919.
1,322,824.
Patented Nov. 25, 1919.
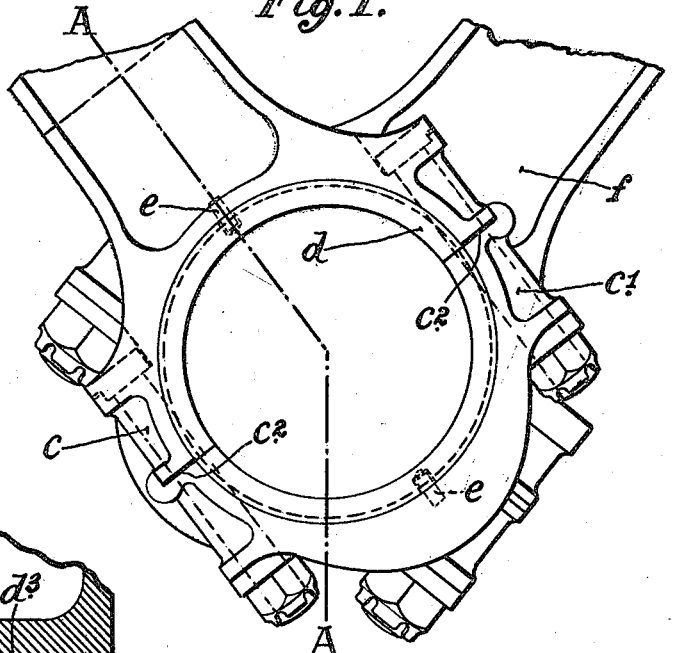
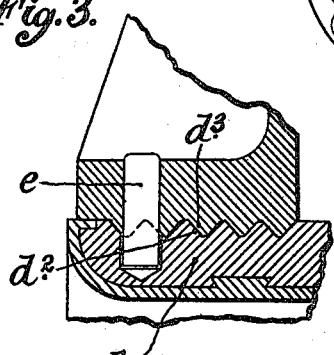
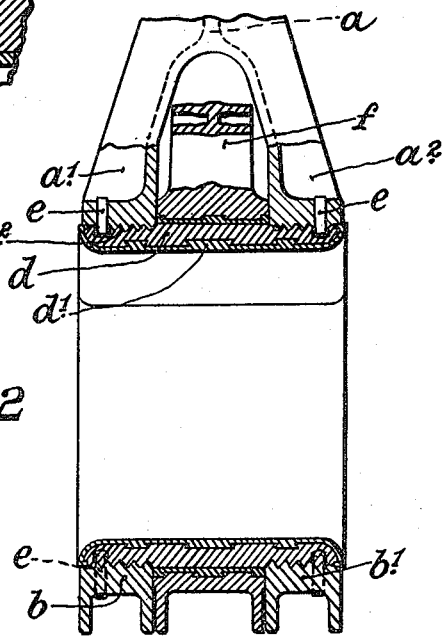
Inventor:
Frederick Henry Royce.
by his Attorney,

UNITED STATES PATENT OFFICE.

FREDERICK HENRY ROYCE, OF OSMASTON, ENGLAND, ASSIGNOR TO ROLLS ROYCE, LIMITED, OF OSMASTON, ENGLAND.

CONNECTING-ROD FOR RECIPROCATING ENGINES.

1,322,824. Specification of Letters Patent. Patented Nov. 25, 1919.

Application filed January 6, 1919. Serial No. 269,820.

*To all whom it may concern:*

Be it known that I, FREDERICK HENRY ROYCE, a subject of the King of Great Britain and Ireland, of Osmaston, in the county of Derby, England, have invented certain new and useful Improvements in Connecting-Rods for Reciprocating Engines, of which the following is a specification.

This invention relates to the mounting of connecting rods of reciprocating engines, especially those having two or more cylinders arranged in pairs with the axes of each pair lying in a plane at right angles to the axis of the crank-shaft.

In arrangements heretofore in vogue there have been used either two similar connecting rods each occupying half the length of the crank pin, or two dissimilar rods, the one linked or hinged to the other at a point some distance removed from the crank pin center, or again, a forked and a single-ended rod both connecting direct on the crank-pin, the single-ended rod lying within the fork of the forked rod with usually a bush extending along and taking bearing on the crank-pin secured rigidly in the forks of the forked end and upon which the single end rod takes bearing.

The desideratum in such connecting rod is to assume that the thrust of each rod shall act directly on the crank-pin and to further assume, for each rod, a maximum bearing length with a minimum length of crank-pin. Each of the arrangements described above has drawbacks peculiar to itself and in the case of the forked end and single end combination, there is a tendency for the fork to open and close when subjected to high stresses.

The object of the present invention is to provide an arrangement of the last mentioned kind but with provision to prevent or resist the tendency for the fork to open and close, while at the same time affording for each rod the maximum of bearing length with the minimum length of crank pin.

The invention is particularly useful in engines where the stresses on the rods are high.

To these ends the connecting rods are constructed, one with a forked end and the other with a single end, the latter adapted to be located within the forks of the forked end and a bush is provided taking its bearing on the crank-pin extended from end to end of said crank-pin, and having, at the end parts which receive the forks, annular grooves or recesses and inside the eyes of the forks are provided corresponding annular projections to engage the said grooves or recesses. The center portion of the outside of the bush is machined smooth and parallel to the crank-pin.

The bush is rigidly attached to the forks of the forked connecting rod and takes bearing on the crank-pin while between said forks it affords a bearing for the single-ended rod.

An embodiment of the invention is illustrated in the accompanying drawings wherein:—

Figure 1 is a view in elevation of the ends of one pair of connecting rods attached to the bush, Fig. 2 is a cross section on line A—A of Fig. 1, and Fig. 3 is an enlarged section of part of Fig. 2 showing the grooved portion of the bush and forked rod.

$a$ designates a connecting rod provided with two forks, $a^1$ and $a^2$, and $b$ and $b^1$ are caps secured to said forks $a^1$ and $a^2$ by the bolts $c$ and $c^1$ to complete the eyes of the fork-ended rod. $d$ designates the bush formed in halves and lined with white metal as customary, shown at $d^1$. Grooves $d^2$ are formed on the outside of said bush, which grooves are engaged by corresponding projections $d^3$ formed inside the eye of the forks $a^1$ and $a^2$. The grooves and projections are so proportioned that when the bolts $c$ $c^1$ are tightened up, the projections of the eyes are pressed closely into the grooves in the bush. In order to insure the full tightening effect of the bolts $c$ $c^1$, a small space $c^2$ is left between the caps $b$ $b^1$, and that part of the eye which is integral with the rod.

Dowel pins $e$ are provided to insure that the joint between the two halves of the bush $d$ falls approximately in the same plane as that between the rod and cap of the forked rod and to insure that the bush shall not rotate relatively to the eyes of the fork-ended rod, said dowel pins are driven tightly into the part of the eye which is integral with the rod and the caps and fit into holes provided for their reception in the bush.

$f$ designates the other connecting rod having a single eye which encircles and takes its bearing upon a smooth parallel portion of the bush $d$ located between the grooved ends thereof.

What I claim as my invention and desire to secure by Letters Patent of the United States is:—

1. In connecting rods for reciprocating engines, the combination of two rods, one having a forked end and the other a single end, the end of the latter rod being disposed between the forks of the former, a bush rigidly attached to the ends of the forked rod and adapted to bear on a crank-pin or equivalent and afford a bearing for the single ended rod, the said bush having annular grooves or recesses, and corresponding annular projections on the ends of the forked rod engaging said grooves or recesses.

2. In connecting rods for reciprocating engines having one or more pairs of cylinders, each pair lying in a plane at right angles to that of the crank shaft, the combination with a pair of cylinders of two rods, one for one cylinder having a forked end and the other for the second cylinder having a single end, the end of the latter rod being disposed between the forks of the first-mentioned rod, a bush rigidly attached to the ends of the forked rod and adapted to bear on the crank-pin or equivalent and afford a bearing for the single ended rod, said bush having annular grooves or recesses, corresponding annular projections on the ends of the forked rod engaging said grooves or recesses and dowel pins fitted in the end of the forked rod and engageable in holes formed in the bush.

In witness whereof I have signed this specification in the presence of two witnesses.

FREDERICK HENRY ROYCE.

Witnesses:
H. R. CUTTEN,
F. PARSONS.